March 16, 1965 E. A. BENDER 3,173,549
MATERIAL HANDLING DEVICE
Filed March 22, 1962 8 Sheets-Sheet 1
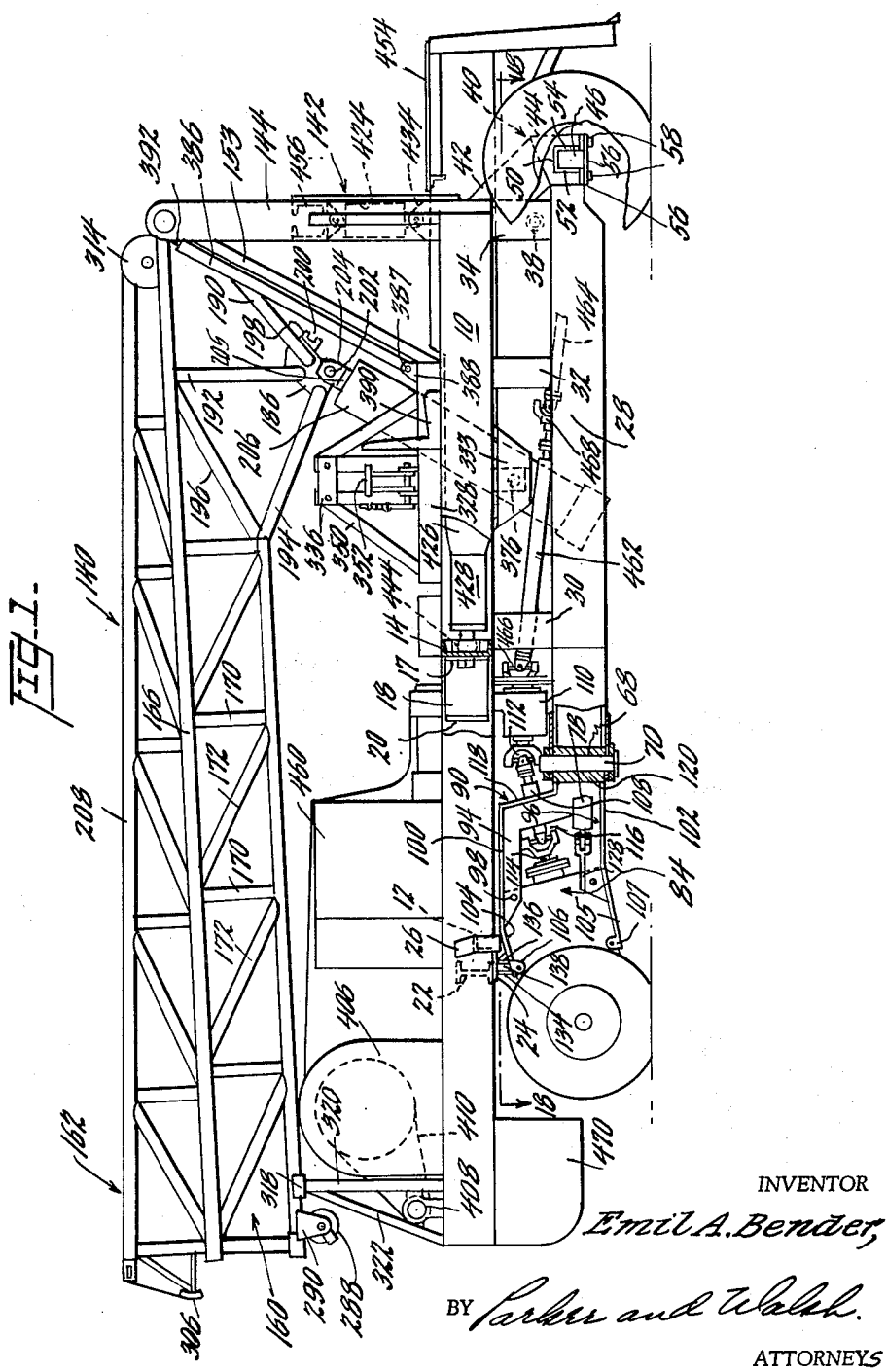
INVENTOR
Emil A. Bender,
BY Parker and Walsh.
ATTORNEYS

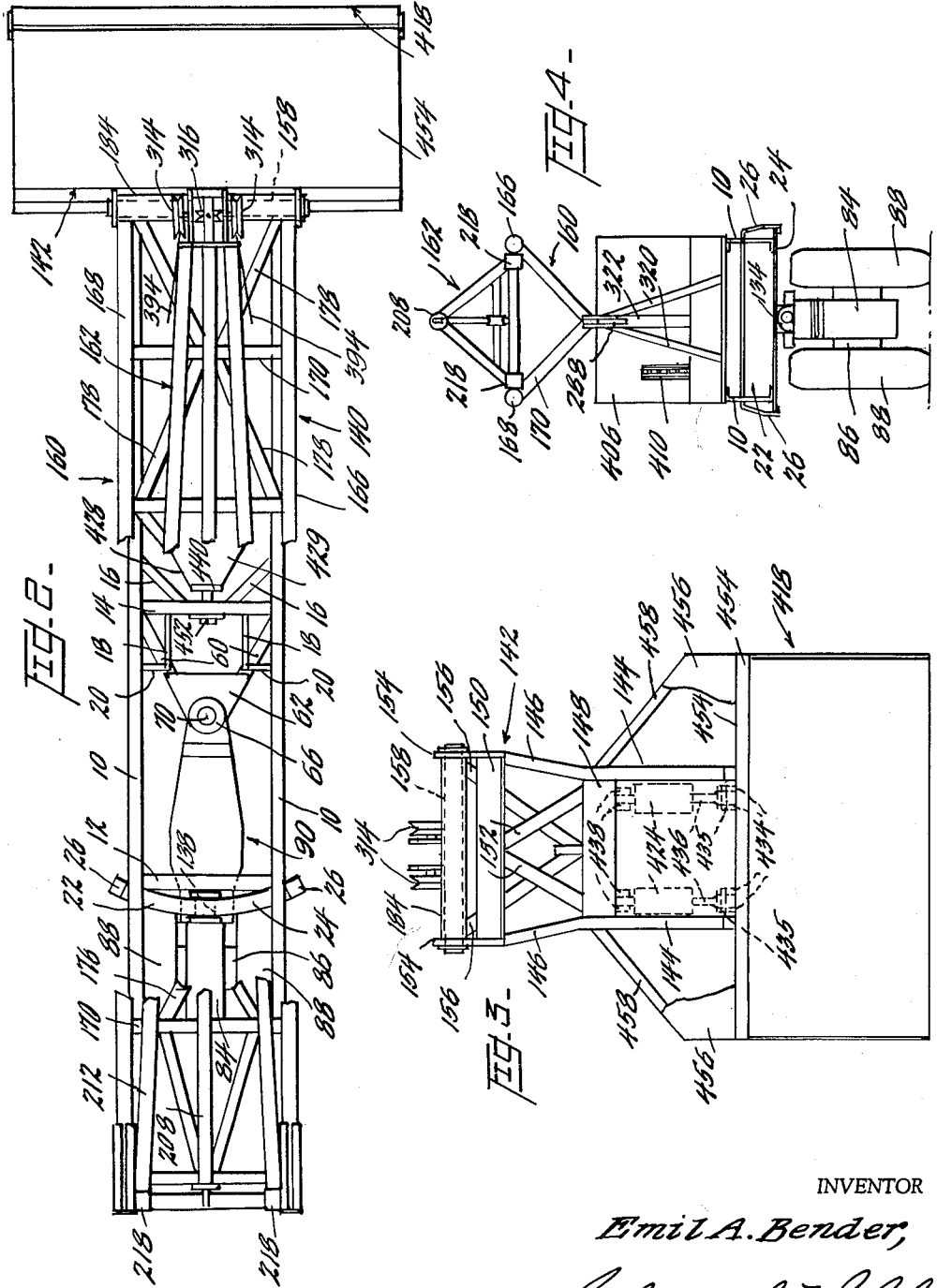

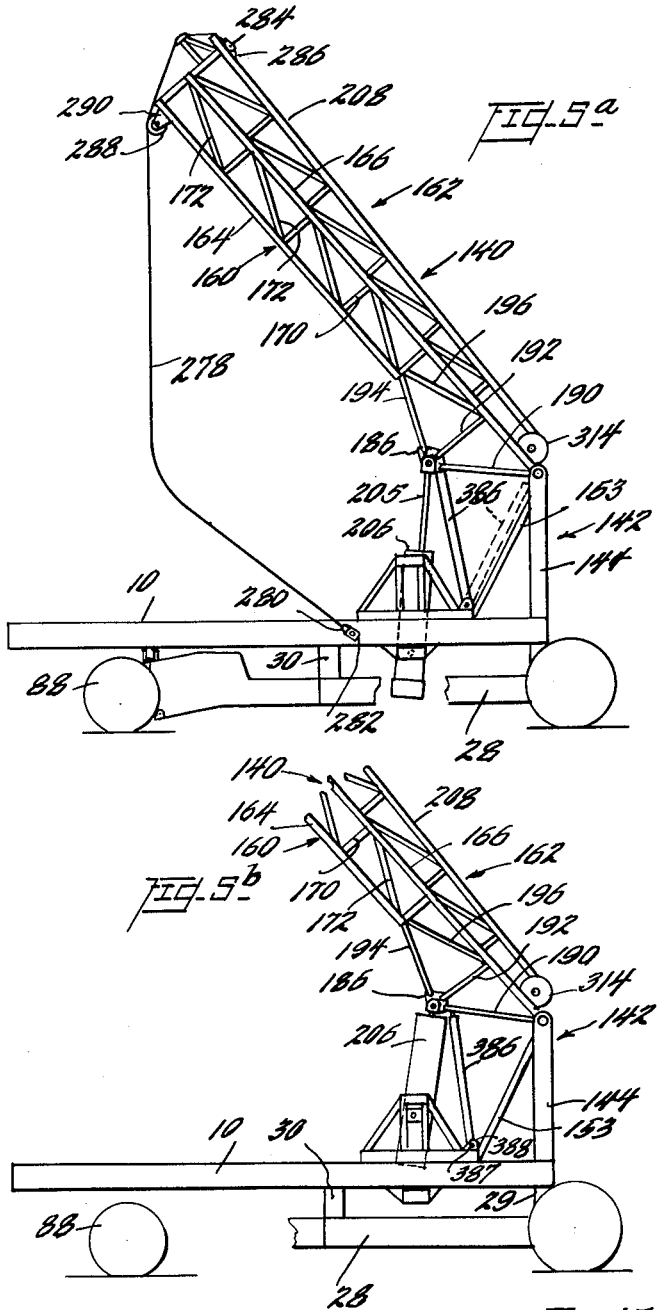

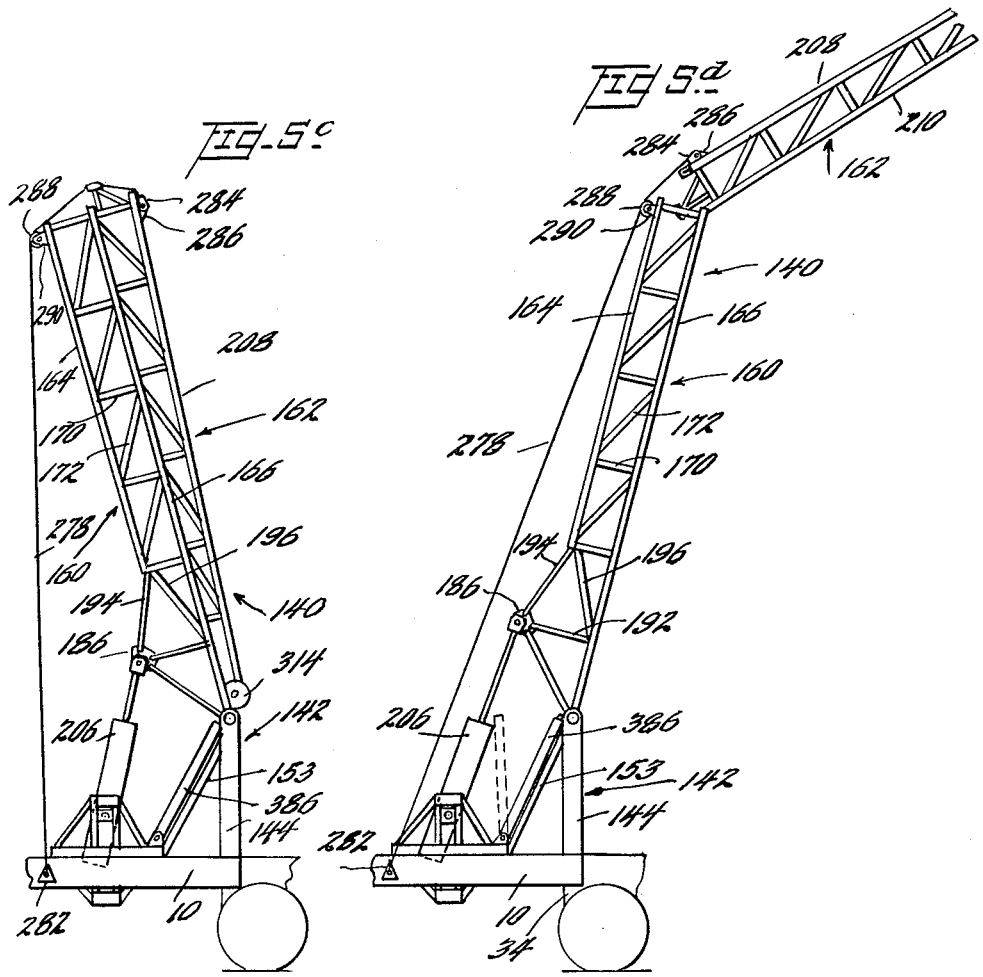

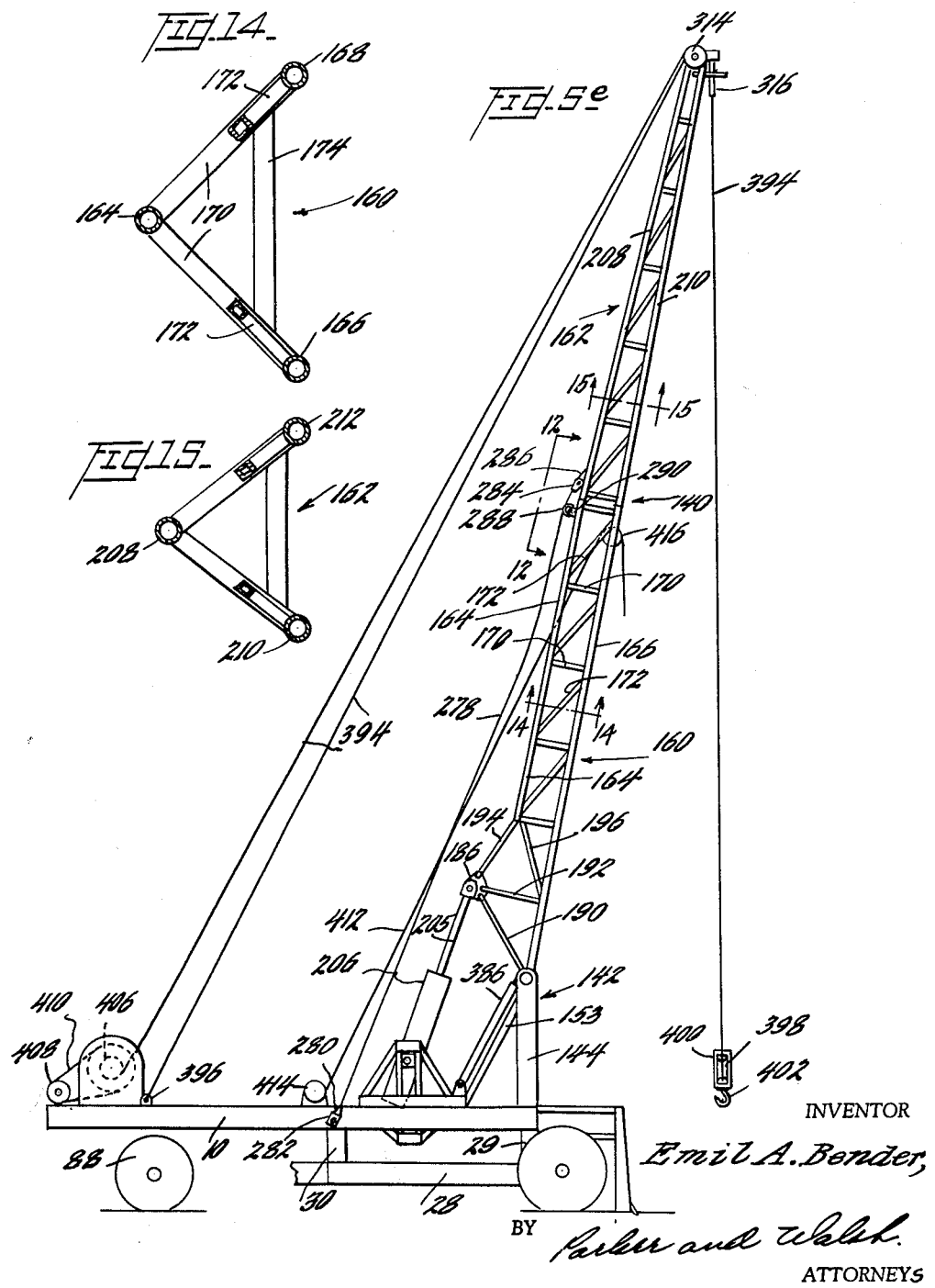

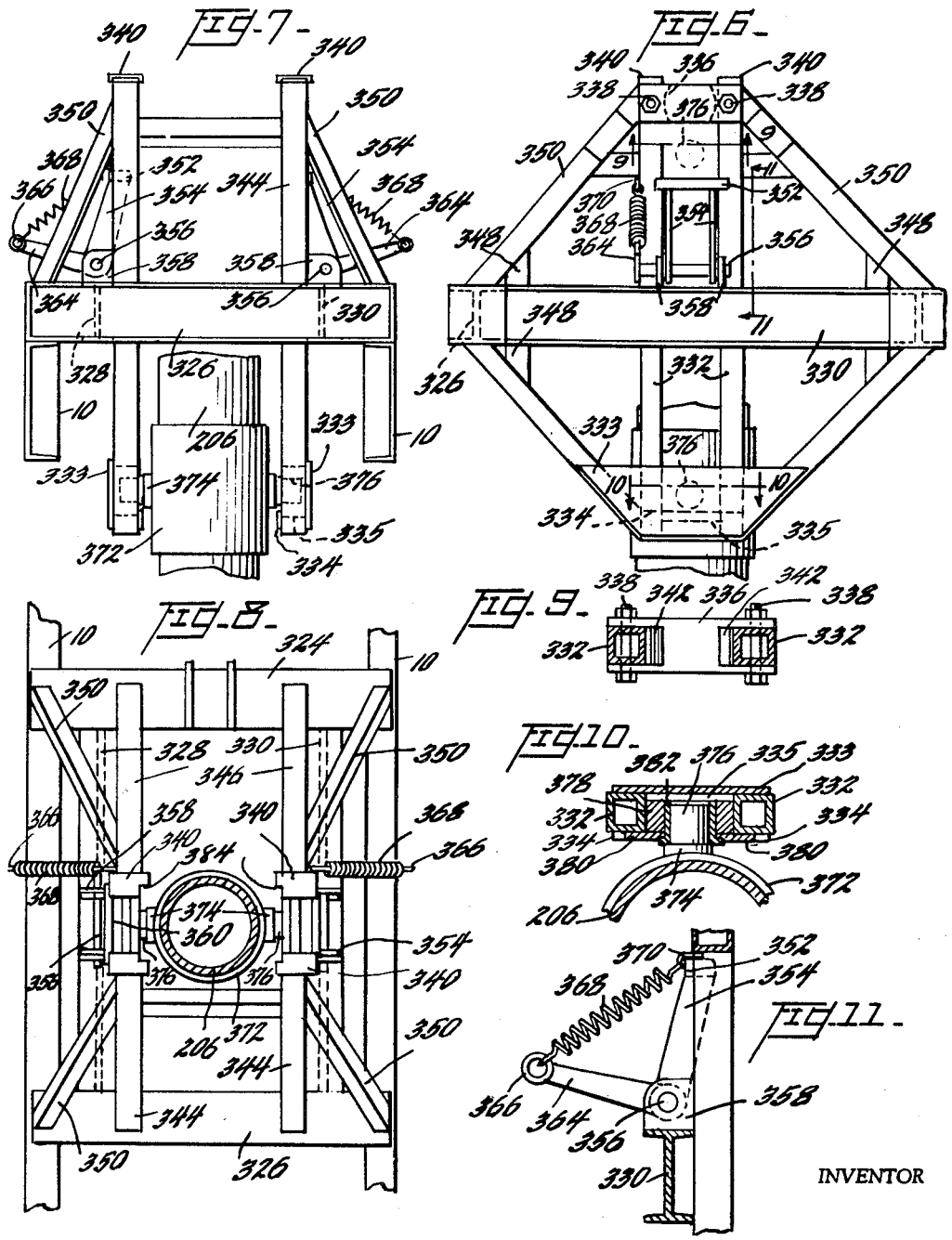

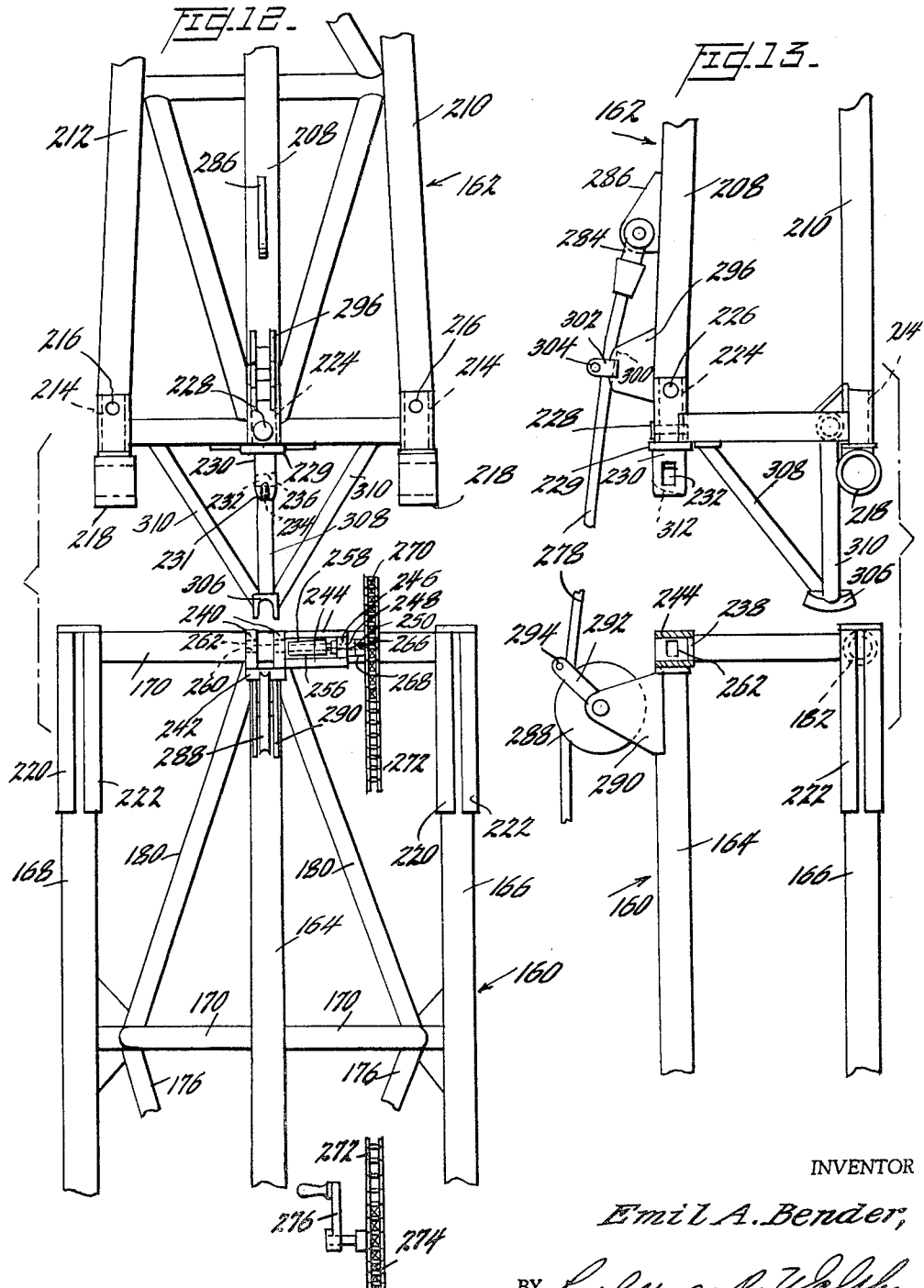

March 16, 1965 E. A. BENDER 3,173,549
MATERIAL HANDLING DEVICE
Filed March 22, 1962 8 Sheets-Sheet 8
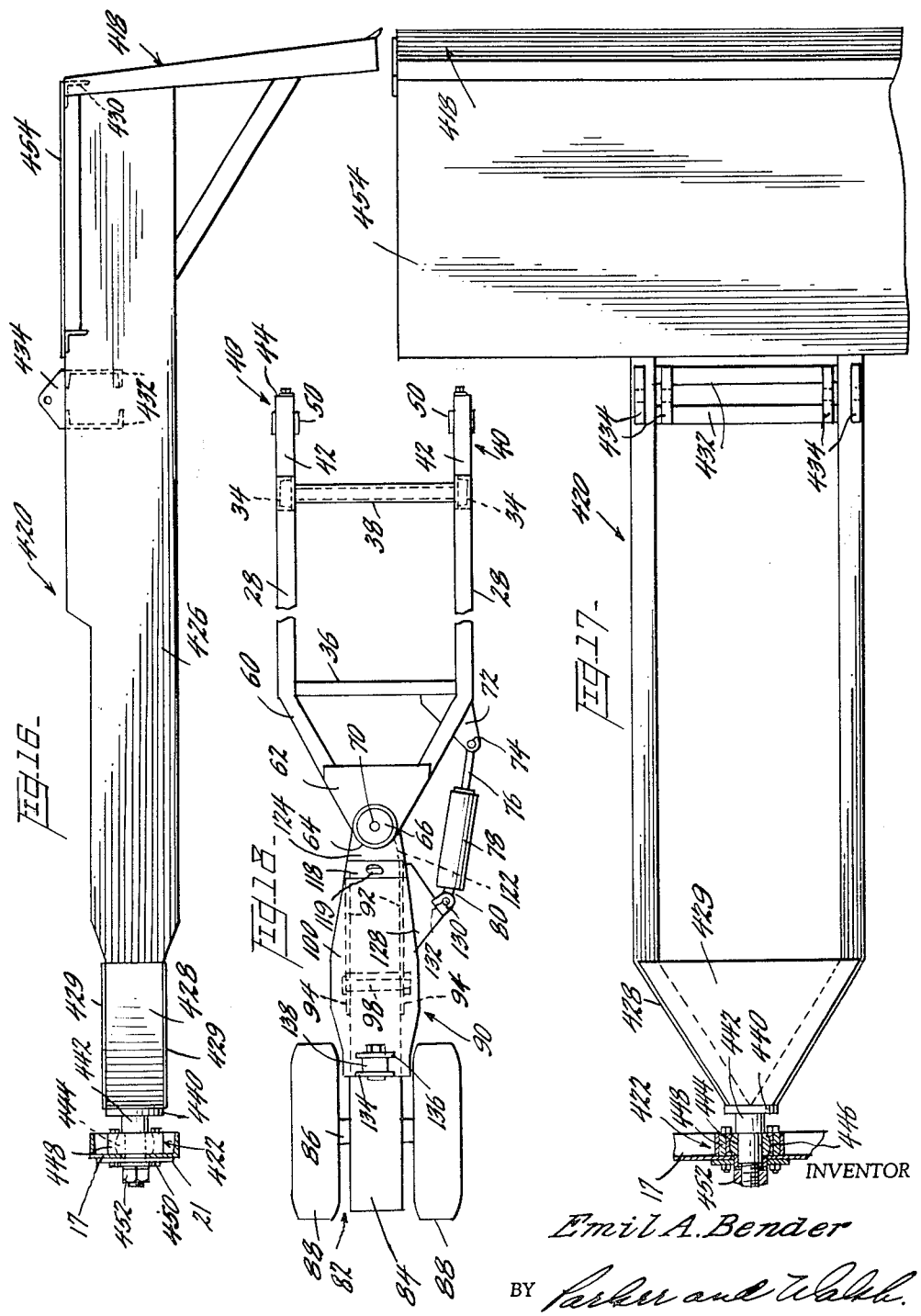
INVENTOR
Emil A. Bender
BY Parker and Walsh
ATTORNEYS United States Patent Office 3,173,549
Patented Mar. 16, 1965

3,173,549
MATERIAL HANDLING DEVICE
Emil A. Bender, P.O. Box 52, Bakersfield, Calif.
Filed Mar. 22, 1962, Ser. No. 181,688
17 Claims. (Cl. 212—8)

This invention relates to mobile hoists, or crane vehicles in general, and bears a general similarity to the device shown in co-pending application, Serial No. 710,268, filed January 21, 1958 now Patent No. 3,059,781, for Material Handling Device. The similarity mentioned is found in such features as an extensible mast pivoted for swinging movement on a single, transverse, horizontal axis, at the front end of the vehicle, driven wheels on fixed axes, at the front and rear of the chassis, and a differential in the front axle for steering by driving, steering means for the rear wheel carriage, power means to erect the mast, and a bulldozer blade carried at the front to provide extra support for mast loads.

Among the chief points of difference of the present device over that of the pending application are the following: (1) The rear wheels are carried on a separate chassis section articulated by a pintle to the main chassis and this rear section supports the rear end of the main chassis with a rolling contact. (2) The mast is hinged for folding at its middle, rather than telescoping. (3) The upper mast section is anchored to the vehicle, for automatic unfolding in response to raising of the mast. (4) The mast raising apparatus is selectively positionable in either of two vertically spaced positions, so as to restore mechanical advantage at an intermediate position of raising of the mast. (5) The load-stabilizing bulldozer is mounted on an elongated frame which is pivotally mounted for swing about a horizontal axis midway of the vehicle.

The crane is a typical device for lifting heavy materials. The ordinary crane has a truck chassis and a surmounting traverse or rotating chassis on which the mast or boom of the crane is supported. The engine for operating the crane is conventionally located on the rotating chassis, serving to counterbalance somewhat the weight of the mast, and the rotating mechanism of the crane is very heavy and expensive because of the weight carried by the rotating chassis and the forces exerted on the rotating mechanism by the crane parts and the load. While cranes frequently have some propulsion system for moving them over short distances, to move a crane any substantial distance it is sometimes necessary to load the crane onto a flat-bed trailer truck and thereby to transport the crane to the desired site of operation. Because of the obstruction to traffic, especially the obstruction created by the long mast, it is usually necessary to obtain a permit to move a crane over public streets, and such movement is frequently restricted to use on week days. A crane is essentially a lifting device, not a lifting and moving device, and while the load may be lifted and turned to the side of the main chassis, the stability of the crane is much less for side loads. When outriggers are employed in an attempt to increase such stability, any inherent mobility of the crane is completely lost. The same deficiencies are characteristic of "clam shells," drag lines, and similar devices which are basically cranes.

It is thus apparent that a need exists for a material handling device that will overcome the foregoing deficiencies, and it is accordingly a principal object of the invention to provide such a device.

Another object of the invention is to provide an improved self-propelled material handling device.

A further object of the invention is to provide a material handling device that is entirely stable, both loaded and unloaded.

Another object of the invention is to provide a material handling vehicle of large capacity yet small enough and light enough to be completely legal so it can be moved without restriction.

Yet another object of the invention is to provide a material handling device that is capable of lifting and carrying heavy loads for considerable distances.

Still another object of the invention is to provide a material handling device that is smaller in size and lighter in weight than comparable devices known heretofore.

A further object of the invention is to provide a material handling device of the aforesaid type that is more versatile than any comparable device known heretofore.

A still further object of the invention is to provide a material handling device which combines the functions of a crane, a truck, and even a bulldozer.

A still further object of the invention is to provide a vehicle having a novel system of steering.

A further object of the invention is to provide a unique vehicle having a first steering system employed in turning loads and moving loads over moderate distances, and a second steering system employed in moving the vehicle on roads over considerable distances.

Still another object of the invention is to provide a novel mast construction.

A further object is to provide a folding mast which is automatically unfolded in response to erection of the mast.

A more specific object of the invention is to provide a novel extensible mast construction, with improved mechanical advantage.

A more specific object of the invention is to provide such a vehicle in which the mast may be extended beyond one end of the vehicle when engaged in material handling operations and may be folded back over the vehicle frame to a rest position which permits the vehicle to move upon public streets without restriction.

A further object of the invention is to provide a vehicle of the foregoing type having means for increasing its longitudinal stability for very heavy loads.

Another object of the invention is to provide a novel material handling vehicle having a mast supported on a frame in such a manner that the mast may pivot about a single horizontal axis but is prevented from pivoting with respect to said frame about any other axis, either horizontal or vertical.

The foregoing and other objects of the invention and the manner in which such objects are accomplished will become more readily apparent upon consideration of the following detailed description of the invention when taken in conjunction with the accompanying drawings, which illustrate an exemplary embodiment of the invention, and wherein:

FIGURE 1 is a side elevational view of the mobile crane, with the boom in collapsed, and stowed position;

FIGURE 2 is a top plan view of the crane shown in FIGURE 1;

FIGURE 3 is a front elevational view of the crane of FIGURE 1;

FIGURE 4 is a rear elevational view of the crane of FIGURE 1;

FIGURES 5a to 5e are views similar to FIGURE 1, reduced in scale, and including only essential outlines, and illustrating the stages of raising the boom or mast, and wherein:

FIGURE 5a shows the mast in the first stage of raising, where it is held by a temporary prop;

FIGURE 5b shows the bearings for the trunnions of the hydraulic cylinder elevated to their position for the second and final stage of erection;

FIGURE 5c shows the mast at a succeeding stage of erection, short of the over-center position, and showing the upper section of the mast in the position where automatic unfolding commences;

FIGURE 5d shows the mast at a further stage of erection, with the mast partly unfolded;

FIGURE 5e shows the mast in working position, forwardly of the overcenter position, and with the mast fully unfolded, and the mast sections latched at the hinged joint;

FIGURE 6 is a view in side elevation, to enlarged scale, of the supporting frame for the boom-lifting, hydraulic cylinder, showing two positions of the trunnion mounts;

FIGURE 7 is a front view of the frame of FIGURE 6;

FIGURE 8 is a top plan view of the frame of FIGURE 6;

FIGURE 9 is a sectional view, taken on the line 9—9 of FIGURE 6;

FIGURE 10 is a sectional view, taken on the line 10—10 of FIGURE 6;

FIGURE 11 is a side view of the latch mechanism for holding the bearings for the trunnions of the hydraulic cylinder, as seen along the line 11—11 of FIGURE 6;

FIGURE 12 is an enlarged, fragmentary, rear elevational view of the mast, at the plane of the hinge joint, as seen along the line 12—12 of FIGURE 5e, showing the mast sections exploded;

FIGURE 13 is a view of the parts of FIGURE 12, rotated through 90°, or as seen from the right in FIGURE 12;

FIGURE 14 is a sectional view through the lower part of the mast, taken on the line 14—14 of FIGURE 5e;

FIGURE 15 is a sectional view through the upper portion of the mast, taken on the line 15—15 of FIGURE 5e;

FIGURE 16 is a side elevational view of the bulldozer frame, separate from the vehicle;

FIGURE 17 is a top plan view of the bulldozer frame of FIGURE 16; and

FIGURE 18 is a top plan view of the rear wheel carriage and driving gear housing, enlarged, as seen along the line 18—18 of FIGURE 1.

Referring to the drawings by characters of reference, there is shown a vehicle having a main frame with a pair of massive, side girders 10 of channel section, connected, at two spaced positions along their length, by a cross-member 12, of angle section, and a suitable cross-member 14 having diagonal braces 16. A cross plate 17 is secured to cross-member 14. Extending rearwardly from cross bar 14 are a pair of plates 18, parallel to, and spaced from, the girders 10, and connected thereto by transverse plates 20. As will be seen, plates 18 provide a support for the transmission for the front and rear drive. The cross plate 17 has a central, reinforcing plate 21, the two having aligned circular openings for accommodating the protruding end of a ball and socket joint on the bulldozer frame, as will be seen.

Adjacent the cross bar 12 is an arcuate cross member 22, formed by bending an I beam, and extending from the inner face of one girder 10 to the inner face of the other, the lower flange of the arcuate beam being notched to clear the lower flanges of girders 10, so that the lower flanges of the girders are flush with the lower flange of the arcuate beam. The latter, as will be seen, constitutes a backing for the supporting track for the rollers of the swivelled rear wheel carriage, the actual track comprising an arcuate plate 24, matching the flange of beam 22, and secured thereto as by welding, and extending sidewise beyond girders 10, where they have outboard support through brackets 26, which may be conveniently formed from the I beam stock. Preferably, the track plate 24 will be fabricated from abrasion-resistant type steel.

For towing the rear wheel truck, the vehicle frame has an underslung, auxiliary frame comprising side beams 28, depending from three spaced pairs of vertical channel beams 30, 32, 34 secured at both ends by welding, and extending from the front of the main frame to about its middle. Beams 28 are joined laterally by a channel beam 36 (FIG. 18) at their rear ends, and near their front ends, a stabilizing spacer tube 38 is secured to the inner faces of vertical channels 34.

Extending forwardly of the composite frame is a mount for the front axle, comprising a pair of fork members 40 of hollow construction, each formed of channel stock, boxed in by a closure plate, and comprising a diagonal leg 42 secured to the front face of girder 10 and vertical channel 34, and a vertical leg 44, secured to the forward edge of beam 28, which extends slightly beyond the front of girder 10. The lower edge of legs 44 each having a rectangular slot 46 accommodating a front axle housing (not shown) which supports the wheels 49, the slot being reinforced on its three sides by plates 50, 52, 54, and the axle housing being locked in by a cover plate 56, secured in place over the slot opening by bolts 58.

At the rear end of the lower frame is a triangular tow hitch (FIG. 18) comprising a pair of converging channel beams 60 secured to channel 36 at its ends and to a pair of generally triangular plates 62 located on the tops and bottoms, respectively, of channels 60, and defining the vertex of the hitch. The rear ends of plates 62 are rounded, as at 64, and superimposed on these areas are matching washers 66, and the washers and plates have a common bore 68 to accommodate the pintle 70 of the rear carriage. Also secured to the outer face of channel 36 at one end thereof is a pair of bracket plates 72, with aligned bores 74, in which is pivotally mounted a piston rod 76 of a hydraulic cylinder 78, the other end of which carries a bracket 80 which pivotally connects to the rear carriage assembly 82, for steering, as will be seen.

Unit 82 comprises a housing 84 through which rear axle 86, carrying rear wheels 88, passes, and which encloses the gearing for the drive to the rear axle. Housing 84 is connected to the pintle 70 through a front harness 90 of generally bifurcated form, with a pair of spaced, parallel, web plates 92, with rearwardly extending tines 94, 96, secured to housing 84 by bolts 98, and upper and lower plates 100, 102, respectively, secured to the edges of plates 92, and bent to conform to the shape thereof, throughout, as well as that of gear housing 84. Thus, the plates, which are horizontal in the region of the tines 94, 96, have slanted, parallel, rear sections 104, 105, having brackets 106, 107 through which they are bolted to casing 84, and which impart a tilt to housing 84 to align it axially with a propeller shaft 108, leading from a transmission case 110. The propeller shaft is coupled to the transmission by a universal 112, and to the gear housing input shaft 114 by a universal 116. Upper plate 100 has a steeply slanted, forward portion 118, conforming to plates 92, and having a suitable opening 119 to pass the propeller shaft 108. A bearing sleeve 120 for the rear carriage pintle, adapted to fit between plates 62 of the underslung frame, is secured to forward extensions 122 of plates 92, and to upper and lower plates 124, which are secured to the top and bottom edges of the extensions.

Lower tine 96 has a horizontal, laterally extending, triangular plate 128, carrying an outer, forked bracket 130, to which cylinder bracket 80 is pivoted through a pin 132. Any relative sliding movement between the cylinder and piston will provide a force tending to swing the rear wheel carriage about the axis of pintle 70, and thus provide steering. Also, if the hydraulic cylinder is neutralized, the rear wheels will follow through, when trailing, after the manner of caster wheels.

In order to avoid undue stresses in the pintle connection, due to the unusually long moment arm from the pintle to the rear axle, the load of the rear end of the main vehicle frame is transmitted directly to gear housing 84 at a point near the rear axle, and this is done through a rolling contact which permits the required swinging movement of the rear carriage. Thus, the slanting section 104 of the upper plate of the tow harness carries a pair of brackets 134, 136, with aligned horizontal bores journalling the shaft of a roller 138 positioned to be contacted by arcuate track plate 24, and to absorb a large portion of the weight in the rear portion of the vehicle while either standing still, or rolling along the track. Obviously this weight will be much greater when the mast is in stowed position.

The mast, or boom, indicated as a whole by the numeral 140, is pivotally supported on an upright framework 142, resting on the main vehicle frame at the forward end thereof. This framework comprises a pair of uprights 144, of hollow, rectangular construction, welded to the tops of girders 10, and having diverging, upper sections 146. The upper part of the framework has a truss construction, with a lower, cross piece 148, comprising a pair of channels, and an upper cross piece 150, also comprising a pair of channels, supported on the tops of uprights 144, and the truss has cross bracing through a pair of diagonally disposed pipes 152. The framework is also supported from the rear by a diagonally disposed pair of tubes 153, welded to the top faces of girders 10, and to the rear faces of uprights 144, near the upper cross piece 150. Also carried on the tops of uprights 144, at the ends of cross piece 150, are two vertical brackets 154, with corner bracing plates 156 and having axially aligned bores, receiving the ends of the hinge pin 158 of the mast.

The main structural members of the mast are tubular throughout, and the mast is generally triangular in cross section, and comprises two sections 160, 162, of about equal length, hinged together for jackknife folding. The lower section 160 is of uniform cross section throughout, and has three longitudinally extending corner tubes 164, 166, 168, the latter two defining the forwardly facing side of the mast when in working position. In the truss work of section 160, pairs of diverging braces 170, extending from the vertex tube 164 to the respective tubes 166, 168, are spaced equidistantly along the section, and diagonal braces 172 are provided between adjacent braces 170 in each of the two mast faces containing braces 170. The equidistant, transverse braces 174 in the third face of the mast are secured to V braces 170 somewhat inwardly from tubes 166, 168, and alternately directed diagonal braces 176 are secured to adjacent braces 174, in three intermediate panels, while in the two lowermost panels, four braces 178 converge on the brace 174 in an X configuration, and in the uppermost panel, two braces 180 converge on the uppermost tube 182, which latter serves as a hinge pin of the jackknife mounting. The lowermost tube 184 in this mast section receives the main hinge pin 158, on which the entire mast swings.

At the lower end of the mast, on the same side as corner tube 164, which may be considered as the backbone of the mast, the mast structure is modified to provide a lever arm for imparting the lift effort to the mast. For this purpose, a plate 186 (FIG. 1) having a bore 188 is carried in spaced relation to the main body of the mast by a series of struts comprising a pair of struts 190 arranged in V form and connecting with the lower, hinge tube 184, another pair 192, also in V form connected to tubes 166, 168, and perpendicular thereto, and a tube 194 connected to the lower end of tube 164 and oblique thereto. The lower end is further braced by a pair of struts 196 in V form, running from the lower end of tube 164 to the respective tubes 166, 168, and oblique to the latter. Plate 186 also has a projection 198, with a notch 200, for a purpose which will be explained hereinafter. Plate 186 is pivoted through a pin 202, to the forked end 204 of the piston rod 205 of a hydraulic cylinder 206, the mounting of which will be later explained.

The upper section 162 of the mast is of gradually diminishing cross section upwardly, but is otherwise generally similar to the lower section, as to structure, and the struts and braces will therefore be understood without any descriptions. The vertex, or backbone tube 208 of the upper section is aligned with and corresponds to lower tube 164, and tubes 210, 212, correspond to tubes 166, 168.

Details of the middle hinge of the mast, as well as the latching mechanism therefor, are shown in FIGURES 12 and 13, both the hinge and the latch being disconnected and the mast parts shown in spaced relation, in a bracketed group. As stated above, the top tube 182 of the lower mast section is the hinge pin. The hinge bushings are carried by the respective mast tubes 210, 212, of the upper mast section, and each comprises a shank 214, fitted in one of the tubes and secured by a transverse bolt 216, to the end of which is welded a perpendicularly disposed tube or bushing 218, which journals the sleeve 182. Preferably, the tubes 166, 168 will be reinforced at their upper ends by oppositely disposed channels 220, 222, nested on the tubes, and secured by welding.

The male component of the latch mechanism comprises a shank 224 fitted in tube 208, and secured therein by a pair of bolts 226, 228, arranged at spaced positions along the shank, and on mutually perpendicular axes. The component has a collar 229, abutting the end of tube 208, and extending therefrom is a diametrically disposed tongue 230, of oblong, rectangular cross section, and tapering end 231, having a central rectangular aperture 232, with one perpendicularly disposed, outer end wall 234, and a slanted, inner, end wall 236. The function of the aperture is to receive a detent, carried by the female component of the latch, which will now be described.

The converging ends of the top pair of V braces 170 of the lower mast section are truncated, and united by a plate 238, which carries a pair of rectangular blocks 240, arranged in spaced, parallel relation at the true vertex of braces 170. The length, depth, and spacing of blocks 240 are slightly in excess of the length, width, and thickness, respectively of the latch tongue 230, so as to receive the latter snugly, when slid into interlocking relation between the blocks 240. The blocks 240 are also welded to a square plate 242, which is, in turn, welded to the top of vertex tube 164 of the lower mast section. Attached to an outer face of one of the blocks 240, and to an extending portion of plate 238 is a detent-mounting bracket of U form, comprising apair of spaced, parallel blocks 244, perpendicular to both blocks 240 and plate 238, and joined by a cross piece 246. The latter carries a central, outer cylindrical boss 248, and the bass and plate 246 have a common bore journalling the smooth shank of a stub shaft 250 having a threaded end received in a detent 256. The latter, which is generally rectangular, and oblong in cross section, has one slanted side edge 258. The detent is adapted to be received in aperture 232 in tongue 230, when the parts are interengaged, and the slant side 258 of the detent is adapted to mate with slant side 236 of the aperture to provide a wedging action in the locking movement. In order to accommodate the detent, the blocks 240 have aligned apertures 260, 262, with straight sides and slant sides corresponding to the shape of the detent. Since the detent moves along shaft 250 in its reciprocating movements, the shaft is held against axial movement. Rotation of shaft 250 to cause sliding movement of the detent is effected through a sprocket 270, which is rotated by a chain 272, engaging a lower sprocket 274, located conveniently to the hand of the operator, and having a hand crank 276. Obviously, other forms of drive for the detent may be employed, and these may include power means.

The mast is unfolded automatically, during erection, by means of a tension cable 278 of fixed, effective length, anchored at one end to the vehicle frame, as by an end plate 280 pivoted in a forked bracket 282 on the vehicle chassis, and at its other end through a plate 284, pivoted to a forked bracket 286, carried near the lower end of backbone tube 208 of the upper mast section. A pair of guide means are provided for cable 278 in the vicinity of the mast hinge (FIG. 13). Since the cable is anchored to the upper mast section, it will have linear movement with respect to the lower mast section during swing, and therefore requires a rolling guide means. For this purpose, a sheave 288 is journalled in a formed bracket 290, carried at the upper end of backbone tube 164 of the lower mast section, and the bracket has a pair of radial arms 292, mounting a pin 294, which serves as a keeper to prevent escape of the cable. Since the cable does not move linearly with respect to the upper mast section, the cable guides on this section may be fixed, and this guide means, therefore comprises a bracket 296, secured to tube 208, and having an outer, saddle-like, arcuate channel 300, and a pair of projecting plates 302, with keeper pin 304. In order to provide effective leverage to initiate unfolding of the upper and lower mast sections during mast erection and also to prevent interference between the cable and the rear edge of the top of the lower mast section, the cable is bent laterally outwardly during the folding movement by a saddle member 306, carried on the lower end of a tube 308, depending from one of lowermost horizontal tubes of the upper mast section, and braced by a pair of diagonal brace members 310, with vertex at the saddle member 306. It will be seen that during the folding action, the saddle 306 contacts cable 278 and holds it away from contact with the latch mechanism during most of the swing. In the latter stages of folding, the cable will contact the tongue 230 of the latch mechanism, and the tongue is therefore provided with an arcuate groove 312, in its lower outer corner, to accommodate the cable.

The crown block assembly of the mast is of the same general type as shown in U.S. Patent No. 2,440,427, to Emil A. Bender, and comprises, in the main, a pair of co-axial sheaves 314, and a depending universally pivoted sheave block 316.

In the folded and lowered position of the mast, the outer end thereof dwells on a rail 318, carried on standards 320 on the girders 10, and having diagonal braces 322.

The mounting for the cylinder 206, which raises the mast, is shown in enlarged detail in FIGURES 6–8. The main support for this system comprises a box frame with two end transverse members 324, 326 of H section, spanning the girders 10 of the vehicle chassis, and welded thereto, and two longitudinal I beams 328, 330, spaced inwardly from the ends of members 324, 326, and with their ends secured thereto, so that the upper and lower flanges of all four members lie in common planes.

The guide means for the vertically adjustable trunnion mounting of the hydraulic cylinder 206 is provided in four vertical tubular posts 332, of square section, secured in pairs to the inner edges of I beams 328, 330, in spaced relation, on opposite sides of the middle line of the beams, and extending about an equal distance above and below the beams.

The two posts attached to each I beam are connected at their lower ends by an outer, spacer plate 333, and an inner, spacer plate 334, enclosing a solid bar 335, which serves as a support, or reaction member for the cylinder trunnion in its lower position. The two posts are also connected at their upper ends by a spacer block 336 which serves as an upper limit stop for the trunnion bearing block, as well as a reaction member for retracting the mast from its forward, working position. This block is preferably removable, to permit removal of the hydraulic cylinder, and is therefore secured to the posts by bolts 338. The blocks 336 are thicker than the width of posts 332, and have slotted ends which engage the posts. The posts have jutting, top closure caps 340, and therefore the slots in block 336 have arcuate bottoms 342, whereby they may be rotated between the posts for removal below the caps 340. Block 336 is shown in FIGURE 6, but is omitted in FIGURES 7 and 8, to show underlying parts.

The posts 332 have extensive bracing of pyramidal form, which includes two front pairs of diagonal braces 344, each extending above and below the box frame, in planes parallel to the webs of I beams 330, one pair having their divergent ends secured to the upper and lower ends of the two forward posts 332, and their convergent ends secured to the forward H beam 326. Rearwardly of the rearward pair of posts 332, a similar set of diagonal braces 346 are arranged in mirror-image-relationship to braces 344, although the rear braces are somewhat shorter. All of the diagonal braces 344, 346 have corner bracing in the form of short uprights 348, of tubing near their converging ends. Additional bracing is provided, above the box frame, by four tubes 350, which extend from the upper parts of the respective posts 332 to the outer ends of H beams 324, 326, and are therefore diagonal with respect to both horizontal and vertical planes.

The latching mechanism for the trunnion bearings comprises a pair of identical units on opposite sides of the posts 332, and only one of these units need be described. The latch comprises a detent bar 352, carried by a pair of spaced, parallel arms 354, fixed to a shaft 356, journalled in a pair of upright brackets 358, mounted on the top of I beams 328 and 330. The bar 352 is longer than the space between the posts 332, but has a narrowed, inner portion 360 adapted to move into the space between the posts. The shaft 356 has a radial lever arm 364, disposed at an angle to the arms 354, and carrying ring 366 at its outer end, for engagement by the outer end of a tension spring 368, the other end of which is anchored in a staple 370, welded to one of the posts 332. It will be seen that the latch is retractable by a pull of the finger, engaged in ring 366, and that it will return by spring action to latching position when released.

The mast-erecting cylinder 206 carries an outer sleeve 372, below its center, with diametrically opposed, circular bosses 374, having reduced outer ends 376, which constitute the trunnions. The trunnions are mounted in a pair of bearing blocks which are slidable between the posts 332 on each side of the mounting framework, and since these blocks are identical, only one need be described and numbered. The main body 378, of the block is of rectangular form, with square, inner and outer faces, having a dimension slightly less than the distance between the posts so as to be insertable therebetween and be slidable therealong without wobbling or jamming, and the thickness of the block is comparable to the width of posts 332. On two opposite edges, the block has plate extensions 380, which engage the inner faces of the posts, and thus limit outward movement of the block. The block has a central bore provided with an inner bearing sleeve 382. In assembly, the bearing block sleeves are slipped over the trunnions and, with top spacer plate 336 removed, the blocks are slid down in the space between posts 332, top plates 340 being rabbeted at 384 to provide clearance for the retainer flange plates 380 of the bearing blocks. The spacer plate 336 is then replaced.

With the mast folded upon itself, and upon the vehicle frame, the hydraulic cylinder 206 is in its lowermost position, with bearing blocks 378 resting on the support bars 335. Through suitable fluid lines and controls, the piston rod of the cylinder is extended, with resultant pressure on lever arm bracket 186, and raising of the mast. This setting will carry the mast to the position shown in FIGURE 5a, after which the trunnions are moved to a higher position, to enable further lifting by the piston rod. This is accomplished by reverse action of the cylinder, which lifts the trunnion bearings to engagement with latch 352, and in this movement the piston rod is held against downward movement by placing a prop 386 under the mast (FIGURE 5b). This prop is pivoted, for swinging movement, on a pin 387, carried by a bracket 388, on the vehicle frame, forwardly of the driver's seat 390, and the prop carries a transverse plate 392 on its top, which engages in the notch 200 of the push bracket 186. When idle, prop 386, is in a forwardly swung position, resting against upright 142. After the bearing blocks have been secured in upper position by the latches 352, the piston is again extended, to continue raising of the mast. When the mast reaches the stage of erection shown in FIGURE 5c, all slack in the cable 278 has been removed, and continued upward swing of the mast results in a pulling effort by the cable on bracket 286 of the upper mast section, which results in an unfolding action of the upper section away from the lower section. In FIGURE 5d this unfolding has progressed until the upper section is close to alignment with the lower section. In FIGURE 5e the mast is over center, the folding is complete, and the parts are latched at the hinge section by hand action on crank 276. In this forward position of the mast, the piston rod 205 is in tension, due to the weight of the mast, and the reaction of the trunnion bearing blocks is upward against the top spacer blocks 336 of the cylinder-mounting framework. It should also be noted that the unfolding operation carries the mast at least as far forward in its swing as the maximum forward working position, so that the cable 278 will have slack in all working positions, as indicated in FIGURE 5e wherein the mast has been retracted from the position where the cable effected the final stage of unfoldings.

For folding and retraction, the mast is lowered until cable 278 is taut, so as to avoid shock thereto, and the latch at the hinge section is withdrawn. Thereafter, as the mast is raised, the upper section lags, by action of gravity, and therefore commences the folding action, which is completed when the lower mast section is strictly vertical, and, of course, persists in this condition during lowering of the mast onto the support 318.

Means may be provided for varying the effective length of cable 278, in which case the mast position at which unfolding commences may be varied. In particular, the lower end of cable 278 may be anchored on a winch, so that not only may its length be varied, for the automatic unfolding, but deliberate unfolding, through winch action, may be resorted to, at any stage of erection.

The hoist cable 394 has one end anchored at 396 to the vehicle frame (FIG. 5e), to provide a dead line, and passes over one of the twin sheaves 314 at the mast crown, from whence it depends, to engage one sheave 398 of a pair of sheaves carried by a travelling block 400, having a depending hook 402, the hoist cable passing upward from the travelling block to pass around the sheave in fixed block 316 at the crown, thence again downward to the second sheave 404 of the travelling block, from whence it leads upward and over the other of sheaves 314 at the crown, and finally to a hoist drum 406, carried by the vehicle, and driven by a hydraulic motor 408, through a belt 410. A snake line 412, for lateral manipulation of loads, and other auxiliary tasks, powered by a winch 414, is trained over a sheave 416, carried on the lower mast section, near the top thereof.

The bulldozer blade, indicated as a whole by the numeral 418, is carried on the front end of a frame 420, extending rearwardly for about half the vehicle length, between the girders 10, and having a three-point suspension, including a ball-and-socket joint 422 at its rear end, and depending near its front end, from a pair of hydraulic cylinders 424 carried by the mast mount 142. Frame 420 (FIGS. 16, 17) comprises two parallel side channels 426, converging at the rear end to form a V section 428, reinforced by upper and lower plates 429. At the front end, channels are joined by a spacer 430 of angle stock, and at about one-third of its length rearwardly of the front end has a pair of transverse spacers 432 of channel section. Mounted on the latter are a pair of brackets 434, carrying a shaft 435 to which are pivoted the piston rods 436 of cylinders 424, (FIG. 3) the upper ends of the cylinders being pivoted in brackets 438, depending from the cross piece 148 of the mast mount 142.

The V-form rear end 428 of the bulldozer frame has a flattened vertex with a reinforcing cap plate 440, carrying a pin 442, mounting a truncated sphere 444, mating in a complementary socket member 446, carried by a housing 448, secured by bolts 450 to the cross member 17 of the vehicle frame, and the pin 442 being secured at its end by a nut 452. It will be seen that as the bulldozer frame is lifted or lowered by hydraulic cylinders 424, the frame swings about the center of ball 444. For the distance moved by the bulldozer blade, from raised position, to ground-engaging position, the angular movement of the ball 444 is small, due to the relatively long radius arm represented by the length of the bulldozer frame, and the long lever arm avoids acute stresses in the bulldozer blade system.

To screen the vehicle and other parts from moving earth, the bulldozer frame is provided with a top, cover plate 454 at its front end, and the mast mount 142 is provided with a screen plate 456, which also extends out in panels on both sides of the mount where it is secured to an auxiliary framework of angle irons 458.

The main power supply in the vehicle is provided in an engine 460, of any suitable, commercially available type, and this provides drive, through the transfer case 110, not only to the rear wheels, but also to the front wheels, through propeller shafts 462, 464, and universal joints 466, 468. A tank 470, carried beneath the vehicle frame, at the rear, may be filled with water, or other fluid, to provide ballast for additional balancing for the hoist load.

It will be seen that the traveling crane described above accomplishes in ample measure the objects enumerated. By the employment of a boom or mast, mounted for swing movement on only a single, horizontal axis, arranged transversely of the vehicle frame, all resultant forces of the hoisting loads occur in a plane longitudinally of the vehicle, as contrasted with the case where the mast, together with the engine, is also swingable on a vertical axis, and, in the case of side loading, must depend on the dubious assistance afforded by the counter weight of the engine and other parts, jutting over the side of the vehicle, or must have outrigger support. Obviously these arrangements are not adapted for self travel of the crane for any appreciable distances. In the present device the flexibility and range of the mast by adjustment through angles of azimuth are provided by the steering arrangement, wherein a turn of short radius may be accomplished by applying the brake to one front wheel and driving the other, leaving the rear carriage free to follow through.

For travel the vehicle may move in either direction, in one case the front wheels being steered by brake manipulation, with the rear carriage following, and in the other case, the rear wheels being steered and the front wheels following.

The provision of a hinged mast not only provides for rapid erection, by unfolding concurrently with the forward swing, but also results in a more rugged structure, as compared to a telescoping boom, since two of the three main mast members, (at the corners of the triangular section) are permanently connected, and only one depends upon a latching connection.

Additionally, the two-stage mount for the trunnions of the mast-erecting cylinder, provides mechanical advantage through a more judicious application of thrust, and enables the use of a cylinder or other power means of reduced size, bulk and power rating, as well as minimizing the chances of structural failures, and hazards to personnel.

As discussed in my aforesaid co-pending application, the bulldozer, while available for all of its usual tasks, has a special cooperative relation to the single-axis mast, in that when urged into ground engagement, it gives further support to augment the reaction forces opposed to the hoist loads, and thus relieves the loading which tends to raise the rear end of the vehicle. In the present device this function, as well as other functions of the bulldozer, are assisted by the swing mounting of the bulldozer blade through a frame which provides a long moment arm, and therefore avoids acute stresses.

Generally speaking, whereas a preferred embodiment has been shown and described, various modifications will become apparent, in the light of this disclosure, and the invention should not, therefore, be deemed as limited, except insofar as shall appear from the spirit and scope of the appended claims.

I claim:

1. A mobile crane comprising an articulated chassis having a front section carrying wheels mounted for rotation on a fixed axis transversely of the front section, and a rear section having wheels mounted for rotation on a fixed axis transversely of the second section, pivot means connecting said sections for relative swinging movement about a vertical axis, means on said front section for swinging said rear section, a series of uprights carried by said front section, an upper chassis frame carried by said uprights and overlying said sections, a roller carried on top of said second section the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, drive means carried by said upper frame and connected to the wheels in each of said sections, a standard mounted on said upper frame, at the forward end thereof, a mast of truss construction and triangular in cross section, pivoted at its bottom and along one side, to said standard, on a horizontal axis arranged transversely of said upper frame, said mast being hinged medially of its length on an axis on said one side, and parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, pivotal mounting means for said thrust means, selectively positionable at two different heights, prop means swingably mounted on said upper frame, and adapted to hold said mast in one position of erection, means anchoring the upper part of said mast to said upper frame, whereby said mast unfolds in reponse to the swinging movement of erection, a pair of power lift means carried by said standard, a frame supported by said lift means and pivoted in a ball-and-socket joint rearwardly of said standard, and an earth-working blade carried on the front end of said latter frame, said earth-working blade, when lowered in contact with the earth, acting to support and stabilize the crane structure during operation of the crane.

2. A device as in claim 1, said thrust means carried by a framework having vertical posts in pairs, and said pivotal mounting means comprising trunnions on said thrust means and bearing sleeve units arranged for vertical sliding movement between said posts, and latch means for holding said units in an elevated position of adjustment.

3. A mobile crane comprising an articulated chassis having a front section carrying wheels mounted for rotation on a fixed axis transversely of the front section, and a rear section having wheels mounted for rotation on a fixed axis transversely of the second section, pivot means connecting said sections for relative swinging movement about a vertcal axis, means on said front section for swinging said rear section, a series of uprights carried by said front section, an upper chassis frame carried by said uprights and overlying said sections, a roller carried on top of said second section, the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, drive means carried by said upper frame and connected to the wheels in each of said sections, a standard mounted on said upper frame, at the forward end thereof, a mast of truss construction and triangular in cross section, pivoted at its bottom and along one side, to said standard, on a horizontal axis arranged transversely of said upper frame, said mast being hinged medially of its length on an axis on said one side and parallel to said horizontal axis, latch means for keeping the mast sections aligned when unfolded, powered thrust means carried by said upper frame and pivotally engaged said mast on a horizontal axis parallel to and offset rearwardly from the axis of pivoting of said mast, pivotally mounting means for said thrust means, selectively positionable at two different heights, prop means swingably mounted on said upper frame, and adapted to hold said mast in one position of erection, and means anchoring the upper part of said mast to said upper frame, whereby said mast unfolds in response to the swinging movement of erection.

4. A mobile crane comprising an articulated chassis having a front section carrying wheels mounted for rotation on a fixed axis transversely of the front section, and a rear section having wheels mounted for rotation on a fixed axis transversely of the second section, pivot means connecting said sections for relative swinging movement about a vertical axis, means on said front section for swinging said rear section, an upper chassis frame overlying said sections, a roller carried on top of said second section, the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, drive means carried by said upper frame and connected to the wheels in each of said sections, a standard mounted on said upper frame, at the forward end thereof, a mast of truss construction and triangular in cross section, pivoted at its bottom and along one side, to said standard, on a horizontal axis arranged transversely of said upper frame, said mast being hinged medially of its length on an axis on said one side and parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, pivotal mounting means for said thrust means, selectively positionable at two different heights, prop means swingably mounted on said upper frame, and adapted to hold said mast in one position of erection, and means anchoring the upper part of said mast to said upper frame, whereby said mast unfolds in response to the swinging movement of erection.

5. A mobile crane comprising an articulated chassis having a front section carrying wheels mounted for rotation on a fixed axis transversely of the front section, and a rear section having wheels mounted for rotation on a fixed axis transversely of the second section, pivot means connecting said sections for relative swinging movement about a vertical axis, means on said front section for swinging said rear section, an upper chassis frame overlying said sections, a roller carried on top of said second section, the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, drive means carried by said upper frame and connected to the wheels in each of said sections, a standard mounted on said upper frame, at the forward end thereof, a mast of truss construction and triangular in cross section, pivoted at its bottom and along one side to said standard, on a horizontal axis arranged transversely of said upper frame, said mast being hinged medially of its length on an axis on said one side and parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, pivotal mounting means for said thrust means, selectively positionable at two different heights, and means anchoring the upper part of said mast to said upper frame, whereby said mast unfolds in response to the swinging movement of erection.

6. A mobile crane comprising an articulated chassis having a front section and a rear section, pivot means connecting said sections for relative swinging movement about a vertical axis, means on said front section for swinging said rear section, an upper chassis frame overlying said sections, a roller carried on top of said second section, the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, a standard mounted on said upper frame, at the forward end thereof, a mast of truss construction and triangular in cross section, pivoted at its bottom and along one side, to said standard, on a horizontal axis arranged transversely of said upper frame, said mast being hinged medially of its length on an axis on said one side and parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, pivotal mounting means for said thrust means, selectively positionable at two different heights, and means anchoring the upper part of said mast to said upper frame, whereby said mast unfolds in response to the swinging movement of erection.

7. A mobile crane comprising an articulated chassis having a front section and a rear section, pivot means connecting said sections for relative swinging movement about a vertical axis, means on said front section for swinging said rear section, an upper chassis frame overlying said sections, a roller carried on top of said second section the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, a standard mounted on said upper frame, at the forward end thereof, a mast pivoted at its bottom to said standard, on a horizontal axis arranged transversely of said upper frame, said mast being hinged medially of its length on an axis parallel to said horizontal axis, latch means for keeping the mast sections aligned when unfolded, powered thrust means carried by said upper frame, and pivotally engaging said mast on a horizontal axis parallel to and offset rearwardly from the axis of pivoting of said mast, pivotal mounting means for said thrust means, selectively positionable at two different heights, and means anchoring the upper part of said mast to said upper frame, whereby said mast unfolds in response to the swinging movement of erection.

8. A mobile crane comprising an articulated chassis having a front section and a rear section, pivot means connecting said sections for relative swinging movement about a vertical axis, means on said front section for swinging said rear section, an upper chassis frame overlying said sections, a roller carried on top of said second section the support for said roller being in close vertical alignment with the axis of rotation of the wheels of the rear section and rotatable on a horizontal axis arranged longitudinally of said second section, a track of arcuate form carried on the underside of said upper frame, and dwelling on said roller, a standard mounted on said upper frame, at the forward end thereof, a mast pivoted at its bottom to said standard, on a horizontal axis arranged transversely of said upper frame, said mast being hinged medially of its length on an axis parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, and pivotal mounting means for said thrust means, selectively positionable at two different heights.

9. A mobile crane comprising an articulated chassis having a front section and a rear section, pivot means connecting said sections for relative swinging movement about a vertical axis, means on said front section for swinging said rear section, an upper chassis frame overlying said sections, a roller carried on top of said second section the support for said roller being in close vertical alignment with the axis of rotation of the wheels of the rear section, a track of arcuate form carried on the underside of said upper frame, and dwelling on said roller, a standard mounted on said upper frame, at the forward end thereof, a mast pivoted at its bottom to said standard, on a horizontal axis arranged transversely of said upper frame, said mast being hinged medially of its length on an axis parallel to said horizontal axis, latch means for keeping the mast sections aligned when unfolded, powered thrust means carried by said upper frame and pivotally engaging said mast on a horizontal axis parallel to and offset rearwardly from the axis of pivoting of said mast, and pivotal mounting means for said thrust means, selectively positionable at two different heights.

10. A mobile crane comprising an articulated chassis having a front, wheeled section and a rear, wheeled section, pivoted together on a vertical axis, means on said front section for swinging said rear section, roller means on said rear section, and said front section having an extension with track means dwelling on said roller means, a mast pivoted forwardly on said front section, for swinging movement about a horizontal axis transverse to said front section, said mast being hinged medially of its length to provide a top section adapted for folding collapse, power means for erecting said mast, mounting means for said power means providing at least two selective positions of anchorage thereof, swingable prop means for holding said mast at an intermediate stage of erection, and anchoring means between the top section of the mast and said front section, adapted to interrupt said top section in its movement and cause its unfolding in response to further erection of the mast.

11. In a crane vehicle, a mast of two sections connected by a hinge medially of its length, power means on the vehicle for erecting the mast, said power means having trunnions, a mount for said trunnions on said vehicle, a pair of vertically disposed guide means in said mount, a block with a bearing sleeve in each of said guide means, and stop means defining at least two vertical positions of adjustment of said blocks.

12. In a device as in claim 11, anchor means between the outer section of said mast and said vehicle, adapted to unfold the top mast section in response to swing of the lower section thereof.

13. In a device as in claim 11, latch means for holding the top section of the mast in fully unfolded condition.

14. A crane vehicle comprising front and rear chassis sections united by a vertical pintle, the front section having an extension with a rolling dwell on the rear section substantially in vertical alignment with the axle on the rear chassis section, a medially foldable mast pivoted on said front section, means to unfold said mast in response to swing about its pivot, and means on said front section to rise the mast, said mast-raising means having a plurality of adjusted positions of anchorage.

15. In a device as in claim 14, prop means for holding the mast during shift of positions of said anchorage.

16. In a device as in claim 14, a bulldozer blade forwardly of said vehicle, mounted on a frame located within said front section, means pivoting said frame on a horizontal axis rearwardly of said mast-raising means, and means adjacent said mast for swinging said frame about its pivot said earth-working blade, when lowered in contact with the earth, acting to support and stabilize the crane structure during operation of the crane.

17. A vehicle as in claim 14, said front section having wheels on a fixed axle, with drive means, and said rear section having wheels on a fixed axle with drive means, and means in the vehicle to swing the rear section about its pintle.

References Cited in the file of this patent
UNITED STATES PATENTS

| | | |
|---|---|---|
| 1,396,598 | Schneider | Nov. 8, 1921 |
| 2,364,851 | Johansen | Dec. 12, 1944 |
| 2,624,131 | Rockwell | Jan. 6, 1953 |
| 2,782,939 | Bernaerts | Feb. 26, 1957 |
| 2,827,715 | Wagner | Mar. 25, 1958 |
| 2,887,191 | Lovell | May 19, 1959 |
| 2,929,517 | Phillips | Mar. 22, 1960 |
| 3,009,546 | Anderson et al. | Nov. 21, 1961 |